United States Patent
Lection et al.

(10) Patent No.: US 10,331,606 B2
(45) Date of Patent: Jun. 25, 2019

(54) HDMI DEVICES AND METHODS WITH STACKING SUPPORT

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 15/290,189

(22) Filed: Oct. 11, 2016

(65) Prior Publication Data
US 2018/0101499 A1    Apr. 12, 2018

(51) Int. Cl.
| | | |
|---|---|---|
| G06F 13/00 | (2006.01) | |
| G06F 13/36 | (2006.01) | |
| G06F 13/38 | (2006.01) | |
| G06F 13/40 | (2006.01) | |
| H01R 13/66 | (2006.01) | |
| G06F 13/42 | (2006.01) | |

(52) U.S. Cl.
CPC ...... *G06F 13/4081* (2013.01); *G06F 13/4022* (2013.01); *G06F 13/4282* (2013.01); *H01R 13/665* (2013.01)

(58) Field of Classification Search
CPC .......... G06F 13/00; G06F 13/36; G06F 13/38; G06F 13/40
See application file for complete search history.

(56) References Cited

U.S. PATENT DOCUMENTS

| | | | |
|---|---|---|---|
| 7,423,218 B2 | 9/2008 | Konda | |
| 7,572,139 B2 | 8/2009 | Montena | |
| 7,833,051 B2 | 11/2010 | Huang et al. | |
| 8,507,796 B2 | 8/2013 | Lu et al. | |
| 9,136,649 B2 | 9/2015 | Shih | |
| 9,167,282 B2* | 10/2015 | Tran | H04N 21/43635 |
| 9,172,174 B2 | 10/2015 | Tsai | |
| 9,190,781 B2 | 11/2015 | Chang | |
| 9,362,673 B1 | 6/2016 | Rinker | |

(Continued)

OTHER PUBLICATIONS

Patnaik et al., "A Method to Quantifiy the Coupling Between DVI and HDMI Connectors," IEEE, 2014 (6 pages).

(Continued)

*Primary Examiner* — David E Martinez
(74) *Attorney, Agent, or Firm* — Griffiths & Seaton PLLC

(57) ABSTRACT

Embodiments for managing High-Definition Multimedia Interface (HDMI) data, such as an HDMI device, are provided. The HDMI device includes a body, first and second HDMI connectors coupled to the body, and an electronic assembly coupled to the body. The electronic assembly is configured to operate in a first mode and a second mode. In the first mode of operation, the electronic assembly causes HDMI data received at the second HDMI connector to be transmitted to the first HDMI connector. In the second mode of operation, the electronic assembly does not cause the HDMI data received at the second HDMI connector to be transmitted to the first HDMI connector.

19 Claims, 9 Drawing Sheets

(56) References Cited

U.S. PATENT DOCUMENTS

| | | |
|---|---|---|
| 2008/0008470 A1 | 1/2008 | Lin et al. |
| 2008/0168519 A1 | 7/2008 | Rao et al. |
| 2009/0147135 A1 | 6/2009 | Shintani |
| 2010/0035547 A1 | 2/2010 | Miyauchi et al. |
| 2010/0088736 A1* | 4/2010 | Besen ................ H04N 21/4122 |
| | | 725/119 |
| 2011/0022739 A1 | 1/2011 | Guillerm et al. |
| 2011/0088056 A1* | 4/2011 | Ansari ................ H04N 7/1675 |
| | | 725/31 |
| 2011/0181781 A1 | 7/2011 | Oh et al. |
| 2011/0187929 A1 | 8/2011 | Suzuki et al. |
| 2012/0026406 A1 | 2/2012 | Takakusaki |
| 2012/0057075 A1 | 3/2012 | Kabuto et al. |
| 2012/0113170 A1 | 5/2012 | Igarashi |
| 2013/0057774 A1 | 3/2013 | Yoshida et al. |
| 2013/0309911 A1 | 11/2013 | Hsu |
| 2013/0340024 A1 | 12/2013 | Macdougall |
| 2014/0090003 A1 | 3/2014 | Eguchi et al. |
| 2015/0042887 A1 | 2/2015 | Schanin et al. |
| 2015/0271417 A1 | 9/2015 | Benabdallah et al. |
| 2016/0104989 A1 | 4/2016 | Zhou |
| 2017/0359630 A1* | 12/2017 | Archibong .............. H04W 4/50 |

OTHER PUBLICATIONS

Owano, "Intel to launch compute-on-a-stick device this year," Tech Xplore, Jan. 8, 2015 (2 pages).

List of IBM Patents or Patent Applications Treated as Related dated Oct. 12, 2016 (2 pages).

\* cited by examiner

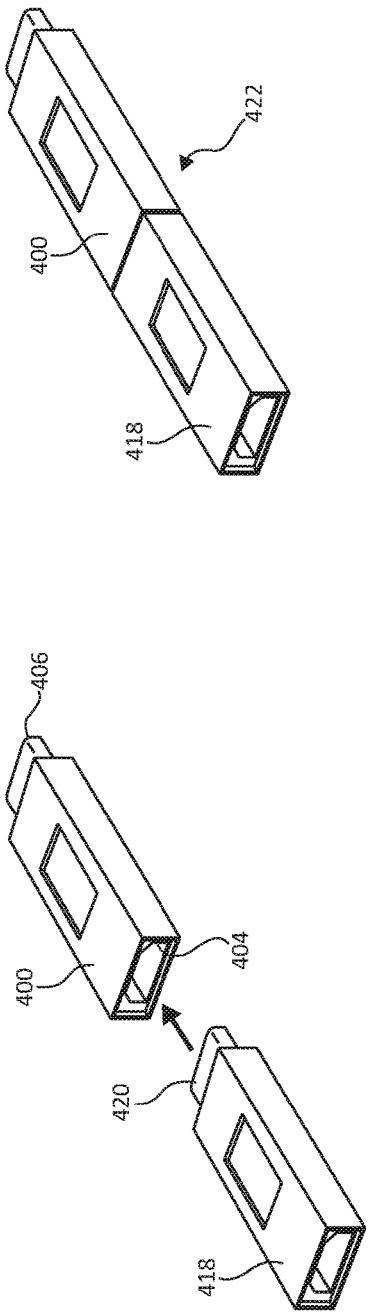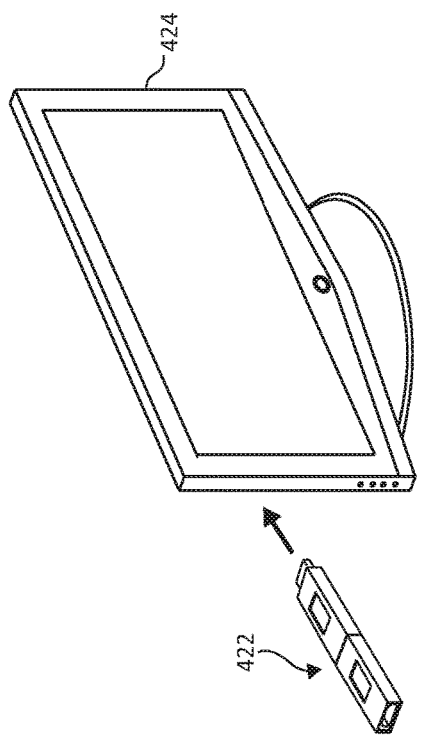
FIG. 6
FIG. 7
FIG. 8

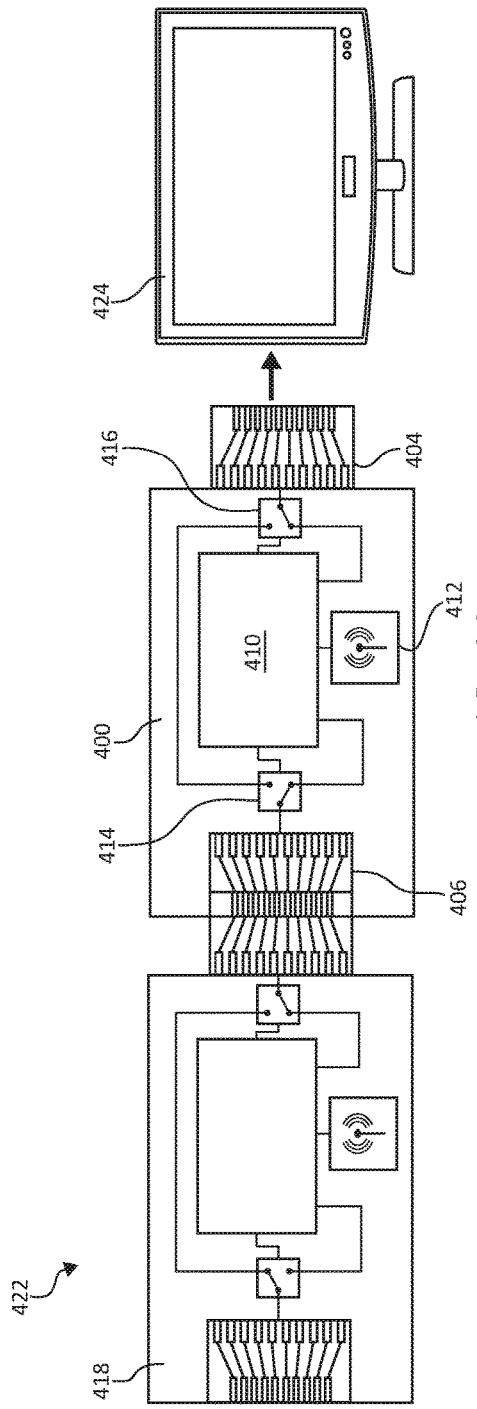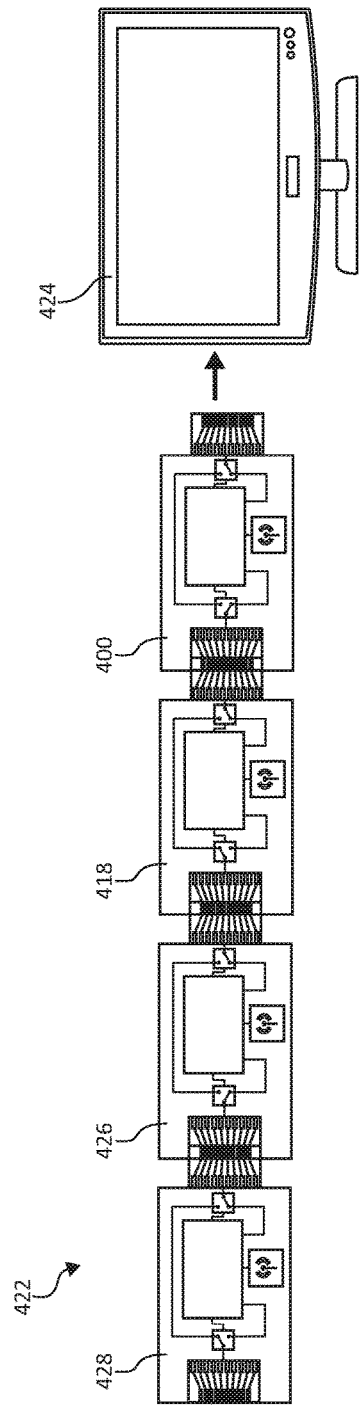

HDMI DEVICES AND METHODS WITH STACKING SUPPORT

BACKGROUND OF THE INVENTION

Field of the Invention

The present invention relates in general to computing systems, and more particularly, to various embodiments for managing High-Definition Multimedia Interface (HDMI) data.

Description of the Related Art

Many modern computing systems, such as high-definition televisions (HDTVs) or liquid crystal display televisions (LCD TVs), are equipped with High-Definition Multimedia Interface (HDMI) ports that may be used to provide audio and/or video signals that may be rendered by the system. Various HDMI components, such as HDMI video devices, sometimes in the form of "sticks," are now offered that provide different types of content, such as video streams, Internet-related products, multimedia experiences, etc.

However, most computing systems are only equipped with one or two HDMI ports. If a user wants to use additional HDMI devices, he or she must incorporate a separate device (e.g., a switch box) to switch between HDMI devices or disconnect (or unplug) the HDMI devices from the computing system and replace them with others. Ideally, users would be able to connect multiple HDMI devices to a single HDMI port and switch between them without requiring the use of another device.

SUMMARY OF THE INVENTION

Various embodiments for managing High-Definition Multimedia Interface (HDMI) data are described. In one embodiment, by way of example only, an HDMI device is provided. The HDMI device includes a body, first and second HDMI connectors coupled to the body, and an electronic assembly coupled to the body. The electronic assembly is configured to operate in a first mode and a second mode. In the first mode of operation, the electronic assembly causes HDMI data received at the second HDMI connector to be transmitted to the first HDMI connector. In the second mode of operation, the electronic assembly does not cause the HDMI data received at the second HDMI connector to be transmitted to the first HDMI connector.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 6 and 7 are isometric views of HDMI devices illustrating the HDMI devices being connected in accordance with aspects of the present invention;

FIG. 8 is an isometric view of two connected HDMI devices being coupled to a computing device in accordance with aspects of the present invention;

FIGS. 9-11 are simplified functional block/schematic views of two connected HDMI devices in operable communication with a computing device in accordance with aspects of the present invention;

FIG. 12 is a simplified function block/schematic view of additional connected HDMI devices in operable communication with a computing device in accordance with aspects of the present invention;

DETAILED DESCRIPTION OF THE DRAWINGS

Figure 1:
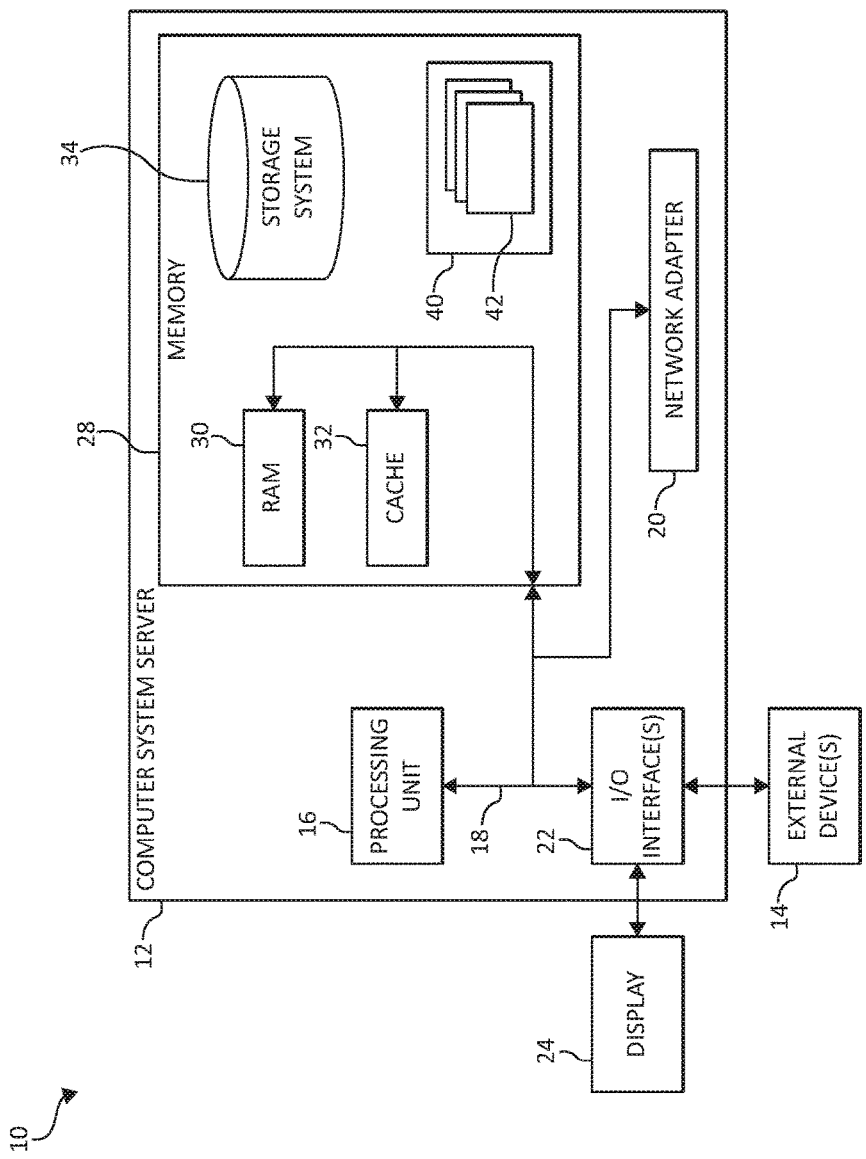
FIG. 1 is a block diagram depicting an exemplary computing node according to an embodiment of the present invention.

As previously indicated, many modern High-Definition Multimedia Interface (HDMI) compatible computing systems, such as HDTVs, LCD TVs, etc., are only equipped with one or two HDMI ports (or female HDMI connectors). If a user wants to use more HDMI devices than the system is normally configured to use, he or she must use an additional device, such as a switch box, or disconnect some of the HDMI devices from the system and replace them with others.

Consider an example in which an LCD TV is equipped with only one HDMI port, and the user has two HDMI devices, each of which is configured to provide a video stream of a sporting event through an online provider. If the sporting events are scheduled to take place at the same time, it would normally not be possible for the user to use both HDMI devices at the same time in such a way the he or she could watch both events simultaneously. Rather, the only way the user could keep track of both events at the same time would be to repeatedly switch back and forth between the two devices, either manually or by using a device such as a switch box.

In view of the foregoing, a need exists for HDMI devices and systems, as well as methods for managing HDMI signals (or data streams), that allow for multiple HDMI devices to be simultaneously connected to a single HDMI port and/or utilized at the same time.

To address these needs, the devices, systems, and methods of the present invention use, for example, an HDMI device(s) having (at least) two HDMI connectors (e.g., a male HDMI connector and a female HDMI connector). It should be understood that in at least some embodiments described below the male HDMI connector may be referred to as a (or the) "first HDMI connector," and the female HDMI connector may be referred to as a (or the) "second HDMI connector." However, the terms "first," "second," "third," etc., may simply be used to differentiate between different connectors (male and/or female), and as such, may be used interchangeably.

An electronic assembly within the HDMI device is configured to operate in at least two modes. In the first mode of operation, the electronic assembly causes HDMI data (or an HDMI signal) received at one (or some) of the HDMI connectors (e.g., a second and/or female HDMI connector) to be transmitted to the other HDMI connector(s) (e.g., a first and/or male HDMI connector). In the second mode of operation, the electronic assembly does not cause the HDMI data received at the HDMI connector to be transmitted to the other HDMI connector (e.g., the electronic assembly prevents the HDMI data from being sent to the other HDMI connector, at least directly).

In some embodiments, in the second mode of operation, the electronic assembly (also) causes HDMI data that is not received at the first HDMI connector to be transmitted to the other HDMI connector. The HDMI data that is not received at the first HDMI connector may be, for example, generated, created, or received, by the electronic assembly. For simplicity, this data (i.e., not received at the first HDMI connector) may be referred to as being "generated" by (or within) the HDMI device. However, as is described below, in addition to being generated (or created) by, for example, a processor within the electronic assembly, this data may be, for example, received by a wireless receiver within the electronic assembly, or stored in a memory within the electronic assembly.

In some embodiments, the electronic assembly is also configured to operate in a third mode in which the electronic assembly causes at least some of the HDMI data that is received at the second HDMI connector and at least some of the HDMI that data is generated by the HDMI device be sent to the first HDMI connector simultaneously (e.g., after being combined).

In some embodiments, the first HDMI connector is a male HDMI connector, and the second HDMI connector is a female HDMI connector. The electronic assembly may include a wireless receiver configured to receive the HDMI data that is generated by the HDMI device. The wireless receiver may be, for example, a wireless local area networks (LAN) receiver, a Long-Term Evolution (LTE) receiver, or LTE Advanced receiver. In some embodiments, the electronic assembly includes a memory in which the HDMI data that is generated by the HDMI device is stored. The electronic assembly may include a processor and/or be implemented as a system-on-chip (SoC).

According to some aspects of the present invention, methods for managing HDMI data are provided. In some embodiments, HDMI data is received at a second HDMI connector of an HDMI device. The HDMI device further includes a first HDMI connector. The HDMI data received at the second HDMI connector is transmitted to the first HDMI connector of the HDMI device. The transmission of the HDMI data to the first HDMI connector is ceased while the HDMI data is still being received at the second HDMI connector of the HDMI device.

In some embodiments, HDMI data that is generated by the HDMI device is transmitted to the first HDMI connector of the HDMI device. In some embodiments, at least some of the HDMI data received at the second HDMI connector of the HDMI device is combined with at least some of the HDMI data that is generated by the HDMI device, and the combined HDMI data is transmitted to the first HDMI connector of the HDMI device.

The HDMI device may include a wireless receiver, and the HDMI data that is generated by the HDMI device may be received by the wireless receiver. The HDMI device may include a memory, and the HDMI data that is generated by the HDMI device may be stored in the memory.

In at least some embodiments described herein, the various signal processing, management, etc., as well as the components used (e.g., the HDMI connectors), are in compliance with the HDMI standards set forth by the Electronic Industries Alliance and Consumer Technology Association (CTA) (formerly Consumer Electronics Association (CEA)), such as the EIA/CEA-61 standards, as is commonly understood.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or the computer system/server 12 therein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device (or electronic assembly) in an HDMI device (or stick) or, for example, a display device, such as a liquid crystal display (LCD) (e.g., a television or monitor). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
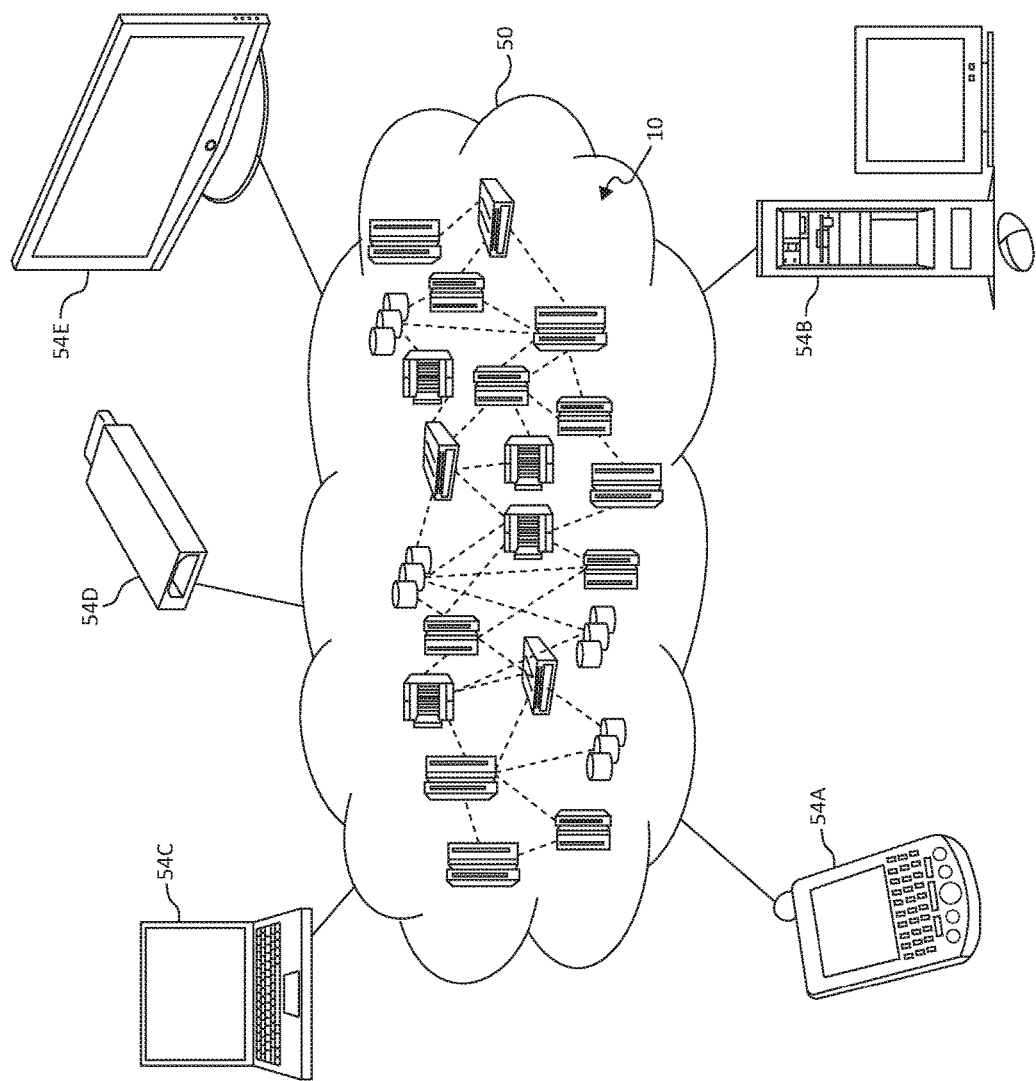
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and HDMI capable systems, such as, for example, those in HDMI devices 54D and display devices (e.g., LCD TVs) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
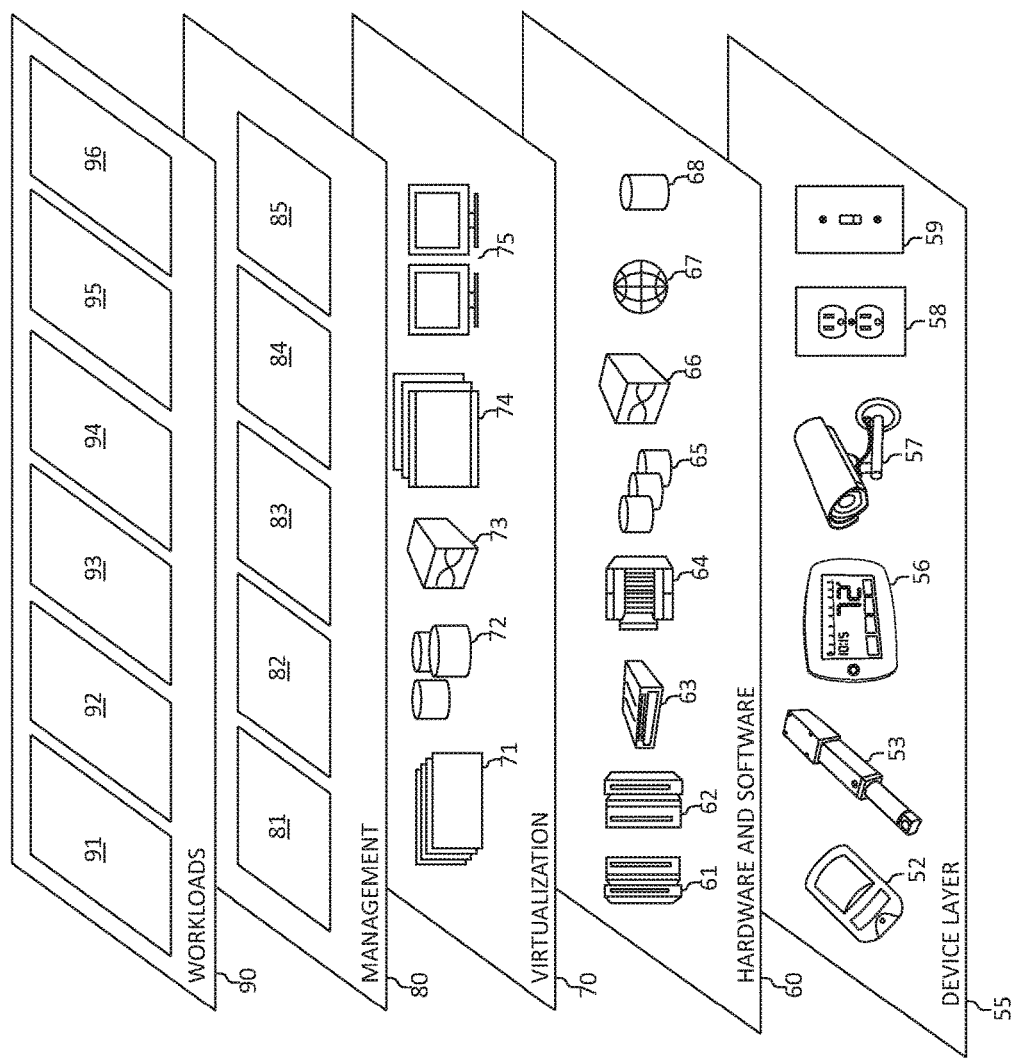
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to HDMI devices, display devices (e.g., HDTVs and LCD TVs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling HDMI devices. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel HDMI devices and methods and systems for managing HDMI data. In some embodiments, the HDMI devices have (at least) two HDMI connectors (e.g., a first and/or male HDMI connector and a second and/or female HDMI connector). An electronic assembly within the HDMI devices is configured to operate in at least two modes. In the first mode of operation, the electronic assembly causes HDMI data (or an HDMI signal) received at the second HDMI connector to be transmitted to the first HDMI connector. In the second mode of operation, the electronic assembly does not cause the HDMI data received at the second HDMI connector to be transmitted to the first HDMI connector (e.g., the electronic assembly prevents the HDMI data from being sent to the first HDMI connector, at least directly).

In some embodiments, in the second mode of operation, the electronic assembly (also) causes HDMI data that is not received at the second HDMI connector (e.g., HDMI data that is generated by the HDMI device) to be transmitted to the first HDMI connector. The HDMI data that is not received at the second HDMI connector may be, for example, generated by, or received by, the electronic assembly. In some embodiments, the electronic assembly is also configured to operate in a third mode in which the electronic assembly causes at least some of the HDMI data that is received at the second HDMI connector and at least some of the HDMI data that is generated by the HDMI device to be sent to the first HDMI connector simultaneously.

Figure 4:
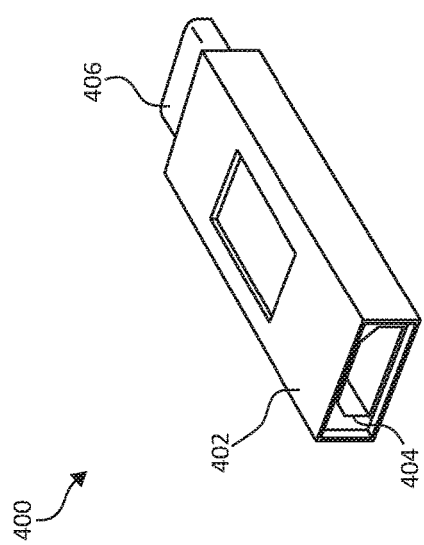
FIG. 4 is an isometric view of a High-Definition Multimedia Interface (HDMI) device in accordance with aspects of the present invention.

Referring to FIG. 4, an HDMI device 400 is shown in accordance with some aspects of the present invention. In the depicted embodiment, the HDMI device 400 is in what may be referred to as a "stick" configuration with, for example, an overall rectangular shape having a length of between 1.0 and 3.0 inches, a width of 1.0 and 2.0 inches, and a height (or thickness) between 0.5 and 1 inches. However, it should be understood that in other embodiments the HDMI devices described herein may have different shapes (e.g., round, square, etc.) and sizes.

Still referring to FIG. 4, as seen from an exterior, the HDMI device 400 includes a body (or housing or frame) 402 with a first HDMI connector (e.g., a male HDMI connector) 404 on a first end thereof and a second HDMI connector (e.g., a female HDMI connector) 406 on a second end thereof (e.g., opposite the first end/first HDMI connector 404). The body 402 may be made of any suitable material, such as a plastic, polymer, composite, metal (e.g., aluminum), etc. Although the HDMI device 400 shown in FIG. 4 includes only two HDMI connectors 404 and 406, it should be understood that in some embodiments, the HDMI devices described herein may include additional HDMI connectors (e.g., more than one male connector and/or more than one female connector).

Figure 5:
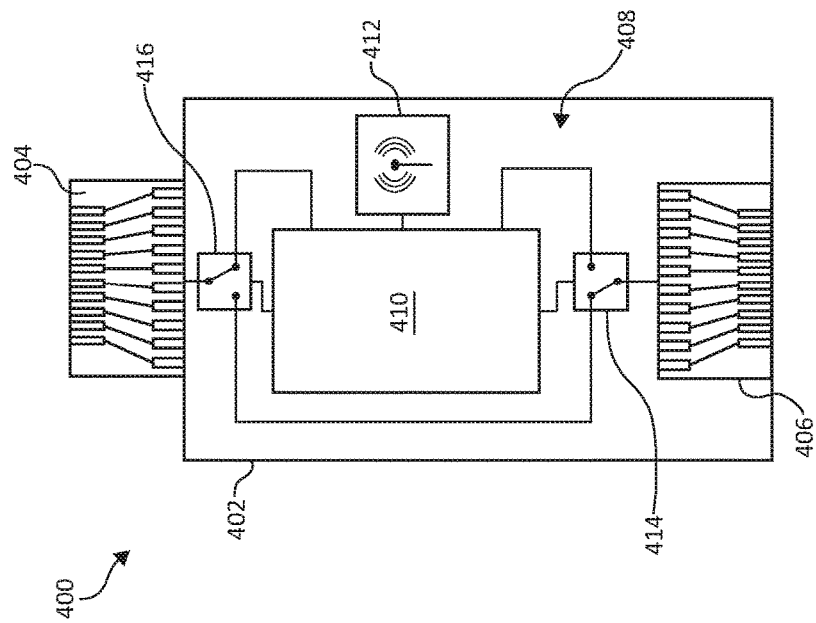
FIG. 5 is a simplified functional block/schematic view of an HDMI device in accordance with aspects of the present invention.

FIG. 5 is a simplified functional block/schematic view of the HDMI device 400 in accordance with some aspects of the present invention. Although the HDMI device 400 may be illustrated in a manner that somewhat resembles a circuit, it should be understood that the components shown within the HDMI device 400 may be understood to simply represent various functionalities of the HDMI device 400, as opposed to specific circuit components. For example, the functionality provided by the HDMI devices described below may be performed "logically" (e.g., by a processor and/or SoC), as is commonly understood, as opposed to the discrete switches and other components, suggested in FIG. 5. In the depicted embodiment, on an interior of (and/or connected or coupled to) the body 402, the HDMI device includes an electronic assembly (or microelectronic assembly) 408. The electronic assembly includes a computing device 410, a wireless receiver (or transceiver) 412, and switches 414 and 416.

Although not shown in detail, in some embodiments, the computing device 410 includes various components such as a processor, memory, etc. (e.g., the components described above with respect to the computer system 12 shown in FIG. 1) and is in operable communication (e.g., electrically connected to) the wireless receiver 412 and the switches 414 and 416. The computing device 410, the wireless receiver 412, and the switches 414 and 416 may be implemented as, for example, a SoC. However, it should be understood that discrete, physical components (e.g., switches) may also be used.

The wireless receiver 412 may be any suitable receiver (and/or transmitter) capable of enabling wireless communication (e.g., via wireless local area networks (LANs), Long-Term Evolution (LTE), LTE Advanced, etc.). In the depicted embodiment, the switches 414 and 416 are two-way switches that are in operable communication with the respective HDMI connectors 404 and 406. As shown, each of the switches 414 and 416 is configured to be connected directly to the other switch (in a first switch mode) or the computing device 410 (in a second switch mode). As is described in greater detail below, the switches 414 and 416 are jointly capable of providing (at least) three modes of operation for the electronic assembly 408.

In a first mode of operation, a signal (e.g., HDMI data) that is received at (or by) the second HDMI connector 406 passes through switch 414, bypasses the computing device 410, and is sent (or transmitted) directly to the first HDMI connector 404 through switch 416, while the computing device 410 is not connected to (or not in operable communication with) the first HDMI connector 404. In other words, the second HDMI connector 406 is connected directly to the first HDMI connector 404, and the computing device 410 is not connected to either of the HDMI connectors 404 and 406. As described above, in some embodiments, physical components (e.g., switches) may be used by the electronic assembly 408 such that a "true bypass" of the computing device 410 is achieved.

In a second mode of operation (the mode of operation shown in FIG. 5), a signal that is received at the second HDMI connector 406 is not sent to the first HDMI connector 404 (or the computing device 410), while the computing device 410 is connected to the first HDMI connector 404. In other words, the second HDMI connector 406 is not connected to either the first HDMI connector 404 or the computing device 410, but the computing device 410 is connected to the first HDMI connector 404 (i.e., via switch 416).

In a third mode of operation, a signal that is received at the second HDMI connector 406 is sent to the computing device 410, while the computing device 410 is connected to the first HDMI connector 404 (i.e., via switch 416). In other words, the second HDMI connector 406 is indirectly connected to the first HDMI connector 404 through the computing device 410.

Referring now to FIGS. 6 and 7, in some embodiments, the HDMI device 400 described above is connected (or attached) to other HDMI devices while in use. Specifically, as shown in FIG. 6, the HDMI device 400 (i.e., a first HDMI device) is connected to a second HDMI device 418. More particularly, an HDMI connector (e.g., a male HDMI connector) 420 of the second HDMI device 418 is inserted into the second HDMI connector (e.g., a female HDMI connector) 406 of the first HDMI device 400. In the particular example shown, the second HDMI device 418 is identical to the first HDMI device 400. However, in some embodiments, the second HDMI device 418 is, for example, a conventional HDMI device (e.g., HDMI stick) with only one HDMI connector (e.g., a male HDMI connector). The first HDMI device 400 combined with the second HDMI device 418 may be considered to form a composite HDMI device 422.

As shown in FIG. 8, the composite HDMI device 422 may then be connected (or attached) to HDMI compatible computing system 424. For example, the first HDMI connector 404 (e.g., a male HDMI connector) of the first HDMI device 400 may be inserted into an HDMI port (e.g., a female HDMI connector) on the computing system 424. In the example shown, in FIG. 8, the computing system 424 is a LCD TV or monitor. However, it should be understood that any suitable computing system may be used, such as desktop computers, laptops, tablets, PDAs, etc.

Figure 9:
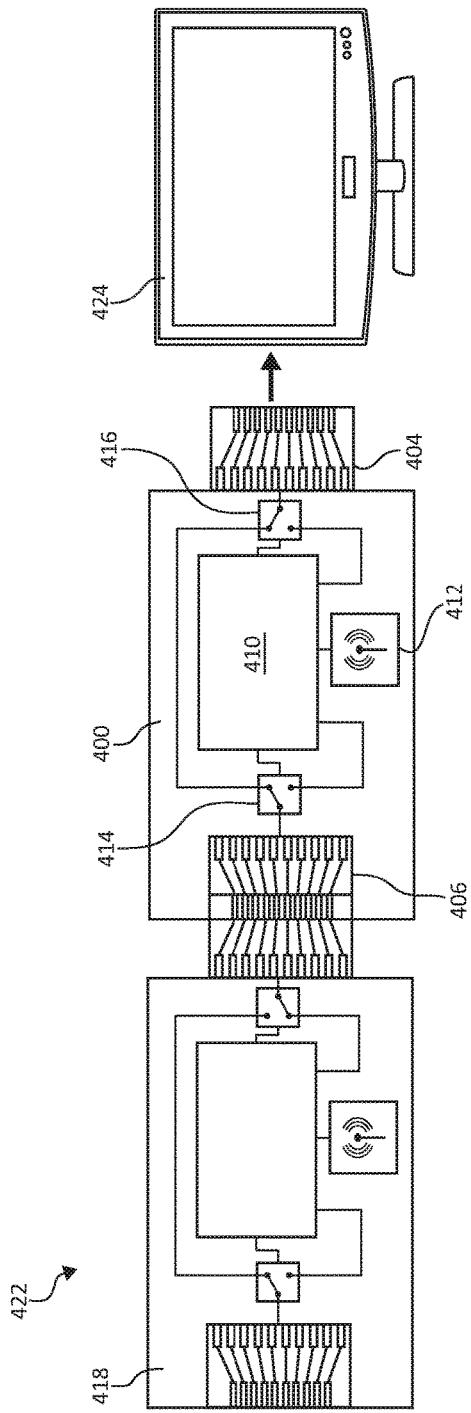
Figure 10:
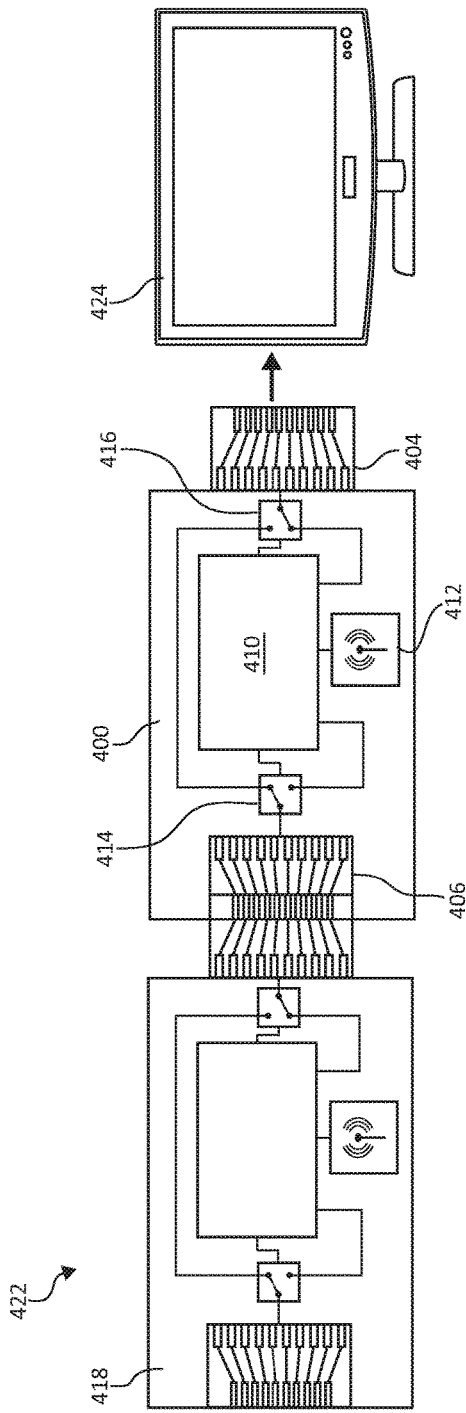

FIGS. 9, 10, and 11 are functional block/schematic views illustrating the composite HDMI device 422 connected (or attached) to (and/or in operable communication with) the computing system 424, with the first HDMI device 400 in different operational modes.

In the operational mode shown in FIG. 9, switches 414 and 416 are configured such that a signal (e.g., HDMI data) that is received by (or at) the second HDMI connector 406 of the first HDMI device 400 from the second HDMI device 418 bypasses the computing device 410 within the first HDMI device 400 and is sent from the first HDMI device 400 to the computing system 424 through the first HDMI connector 404 of the first HDMI device 400. Thus, in this operational state, the signal may be sent from the second HDMI device 418 to the computing system 424 without being modified or altered in any way by the first HDMI device 400, while no signal (e.g., HDMI data) that is generated by the first HDMI device 400 (e.g., HDMI data that is received through the wireless receiver 412) is sent to the computing device 424.

In the operational mode shown in FIG. 10, switches 414 and 416 are configured such that a signal that is received by the second HDMI connector 406 of the first HDMI device 400 from the second HDMI device 418 is neither sent directly to the first HDMI connector 404 nor to the computing device 410 within the first HDMI device 400. Thus, in this operational state, a signal being sent from the second HDMI device 418 is not sent to the computing system 424. Rather, in this operational state, a signal that is generated by the first HDMI device (e.g., generated by the computing device 410 and/or received through the wireless receiver 412) may be sent to the computing system 424 through the first HDMI connector 404.

In the operational state shown in FIG. 11, switches 414 and 416 are configured such that a signal that is received by the second HDMI connector 406 of the first HDMI device 400 from the second HDMI device 418 is sent to the computing device 410 of the first HDMI device 400. Additionally, a signal that is generated by the first HDMI device 400 (e.g., generated by the computing device 410 and/or received through the wireless receiver 412) may be sent to the computing system 424 through the first HDMI connector 404, perhaps in combination with the signal that is received from the second HDMI device 418. Thus, in this operational state, a signal (or HDMI data) that is a combination of what is received from the second HDMI device 418 and generated by the first HDMI device 400 may be sent to the computing system 424. In other words, two signals (e.g., HDMI data streams), or at least a portion thereof, generated by two difference HDMI devices may be simultaneously provided to the computing system 424 through a single HDMI device (e.g., the first HDMI device 400).

Although the composite HDMI device 422 described above includes two HDMI devices 400 and 418, it should be understood that in some embodiments, additional individual HDMI devices may be added. For example, as shown in FIG. 12, the composite HDMI device 422 includes four HDMI devices: the first and second HDMI devices 400 and 418 described above and two additional HDMI devices 426 and 428. In some embodiments, all of the HDMI devices 400, 418, 426, and 428 are identical, or substantially identical (e.g., include the switching functionality described above). However, it should be understood that some of the devices, such as HDMI device 428, may be, for example, a conventional HDMI device (e.g., with only one HDMI port). In embodiments utilizing the switching functionality described herein, signals from the individual HDMI devices 400, 418, 426, and 428 may be selectively sent to the computing system 424, or alternatively, combined with the signals from the other HDMI devices in a manner similar to that described above. For example, the HDMI devices 400, 418, 426, and 428 may be configured such that a signal from HDMI device 428 (e.g., received by a wireless receiver thereon) is sent through HDMI devices 426, 418, and 400 and into the computing system 424 while bypassing the computing devices within HDMI devices 426, 418, and 400. Alternatively, HDMI devices 426, 418, and 400 may be selectively configured to combine the respect signals (or at least portions thereof) generated therein (or received by the respective wireless receivers) with the signal sent from HDMI device 428.

It should be noted that when the HDMI devices are attached as shown in FIGS. 9-12, HDMI devices that are connected between the computing system 424 and other HDMI devices may be considered to be "downstream" from those other HDMI devices, and vice versa with respect to "upstream." For example, referring again to FIG. 12, HDMI device 418 may be considered to be downstream from HDMI devices 426 and 428, while HDMI device 428 may be considered to be upstream from HDMI devices 400, 418, and 426.

The HDMI device(s) described above allows for HDMI data (or content) from multiple HDMI devices to be transmitted to a computing system (e.g., a LCD TV) through a single HDMI connector (or port) on the computing system, perhaps simultaneously. As one relatively simple example, referring again to FIGS. 9-11, the first HDMI device 400 may be configured to provide a first type of content (e.g., a professional football program) to the LCD TV, while the second HDMI device 418 may be configured to provide a second type of content (e.g., a professional golf program) to the LCD TV. Utilizing the switching functionality provided above, the HDMI device(s) may switch between which of the two types of content is being displayed on the LCD TV. The HDMI device(s) may be preconfigured to such that the switching functionality is initially set up in a particular way (e.g., which may be chosen by a user) and then switched/changed based on the various factors/inputs described herein. In some embodiments, a user is able to simply switch between the different content types using, for example, a user input device (e.g., a remote control). However, the switching may be based on other factors, as described in greater detail below.

As another example, the content provided by each of the HDMI devices may compliment each other and be combined into a single HDMI stream that is transmitted into the LCD TV (or other computing system). For instance, if one of the HDMI devices is configured to provide a professional athletics program, another of the HDMI devices may provide additional content related to that professional sport (e.g., statistics, interviews, advertising of products related to that sport, etc.), and in some embodiments, both types of content are provided to the LCD TV simultaneously, with the additional content overlaying a portion of the base content on the LCD TV screen, for example, in a "picture-in-picture" format or with some of the content being displayed in (or as) a marquee (e.g., a scrolling marquee along the bottom or top of the display). As one skilled in the art will recognize, other formats of combined content may be rendered, and the above examples are in no way intended to limit the scope of the content mixing process.

In some embodiments, the switching of the content (or HDMI data or signal) that is provided to (and/or displayed by) the computing system is performed based on a time schedule. For example, the switching may be performed at a certain time(s) of day and/or on a regular interval (e.g., every 30 minutes), which may be programmed by the user. As a more specific example, the content from one of the HDMI devices (e.g., a local news program) may be displayed on an LCD TV for 30 minutes before the content is switched to that from a second of the HDMI devices (e.g., a local weather program). The content from the second of the HDMI devices may then be displayed for a predetermined amount of time, such as 5 minutes, before the content is switched back to that of the first HDMI device.

In some embodiments, the switching of the content is based on a priority signal provided from at least one of the HDMI devices (and/or embedded within the respective content or signal). For example, consider an example in which three HDMI devices are connected as described above. One of the devices may be configured to provide content related to recent events in the news and embed a priority signal within its HDMI content (or stream) when a breaking news story/event occurs. In such an example, one, or both, of the other HDMI devices may recognize that priority signal and cause the content provided to the LCD TV to be switched to the content from that HDMI device.

As mentioned above, in some embodiments, the content from multiple HDMI devices may be essentially combined (and/or altered based on an "upstream" HDMI device) and provided to the LCD TV simultaneously and presented in, for example, a picture-in-picture format. For example, one of the HDMI devices may provide content related to recent political news/events, while another of the devices provides content related to business/financial news. In some embodiments, the political news content may be displayed as the primary content on the LCD TV, and the business/financial news may be secondary content that is displayed in a relatively small window on the LCD TV (i.e., picture-in-picture) (or vice versa). In such embodiments, the content displayed as the primary and secondary content may be switched back and forth, using, for example, the time schedule and/or priority signal described above.

In some embodiments, content from one of the HDMI devices may be used to enhance the content from another of the HDMI devices. For example, one of the HDMI devices may analyze the HDMI data (e.g., video stream and/or meta-data) from an upstream device and add content, such as advertisements, related content, and social media data (e.g., comments posted by a user's friends on a social media platform). The order (or arrangement) of the HDMI devices may affect the manner in which the content is eventually displayed on, or presented by, the computing system.

In some embodiments, the HDMI device(s) are used to "capture" some of the data provided by one or more of the HDMI devices. For example, a video stream may have a signal embedded therein indicating that a portion of the video is to be posted on, for example, a user's social media profile. In such an embodiment, one of the HDMI devices (e.g., one that is downstream from the device from which the video stream originated within the composite HDMI device) may capture (or record) that portion of the video stream and cause it to be posted on the user's social media profile (e.g., using a transmitter within that particular HDMI device).

Figure 13:
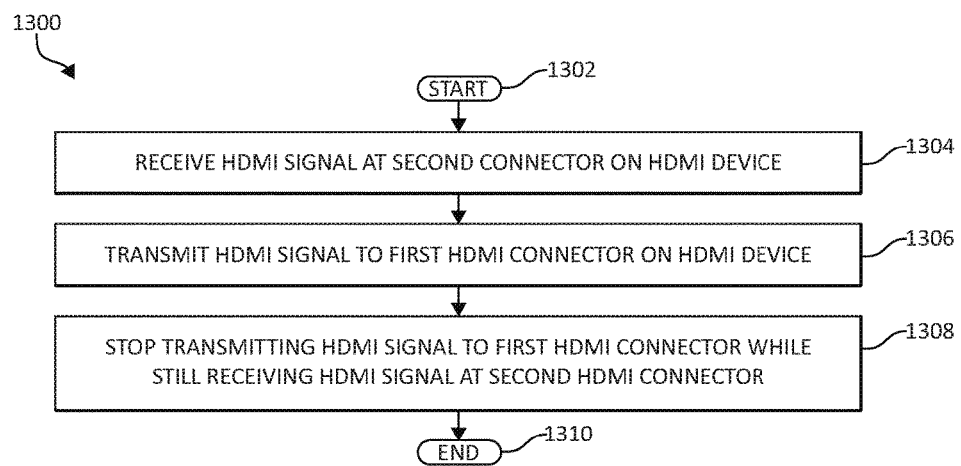
FIG. 13 is a flowchart diagram depicting an exemplary method for managing HDMI data in which various aspects of the present invention may be implemented.

Turning to FIG. 13, a flowchart diagram of an exemplary method 1300 for managing HDMI data (or signals or content), in accordance with various aspects of the present invention, is illustrated. Method 1300 begins (step 1302) with, for example, a first HDMI device (e.g., HDMI device 400 in FIGS. 6-12, having first and second HDMI connectors) being connected to a computing system, such as an LCD TV, and a second HDMI device (e.g., HDMI device 418 in FIGS. 6-12 or a conventional HDMI device) being connected to the first HDMI device. More particularly, in some embodiments, method 1300 begins with an HDMI connector (e.g., a male HDMI connector) of the second HDMI device being inserted into a second (e.g., female) HDMI connector of the first HDMI device, and the first (e.g., male) HDMI connector of the first HDMI device being inserted into an HDMI port (or female connector) of the computing system.

An HDMI signal (or HDMI data) is then received at the second HDMI connector of the (first) HDMI device (step 1304). More particularly, in some embodiments, an HDMI signal is sent from the second HDMI device to the second connector of the first HDMI device. In the depicted embodiment, the HDMI signal received at the second HDMI connector of the (first) HDMI device is transmitted (or sent) to the first HDMI connector of the (first) HDMI device (step 1306). In some embodiments, the HDMI signal is sent to the first HDMI connector without being altered, modified, or combined with any other data (e.g., a second HDMI signal). As described above, HDMI signal may then be transmitted to the computing system through the first HDMI connector.

The transmitting of the HDMI signal to the first HDMI connector is then stopped (or ceased) (step 1308). In some embodiments, the transmitting of the HDMI signal is stopped while the HDMI signal is still being received by (or provided to) the second HDMI connector of the HDMI device (e.g., while the second HDMI device is still connected to the first HDMI device). As described above, the managing of the HDMI signal within the HDMI device may be performed by an electronic assembly (e.g., switches, a processor, a SoC, etc.) within the HDMI device. As described above, in some embodiments, after the transmitting of the HDMI signal to the first HDMI connector has stopped, another HDMI signal (e.g., generated by the electronic assembly) may then be sent to the first HDMI connector. Method 1300 ends (step 1310) with, for example, the HDMI device(s) being disconnected from the computing system.

It should be understood that the steps described above may be performed in a different order. For example, after the HDMI signal is received at the first HDMI connector (step 1304), the signal may be initially blocked (or prevented) from being transmitted to the second HDMI connector (step 1308), and then transmitted to the second HDMI connector (step 1306).

Figure 14:
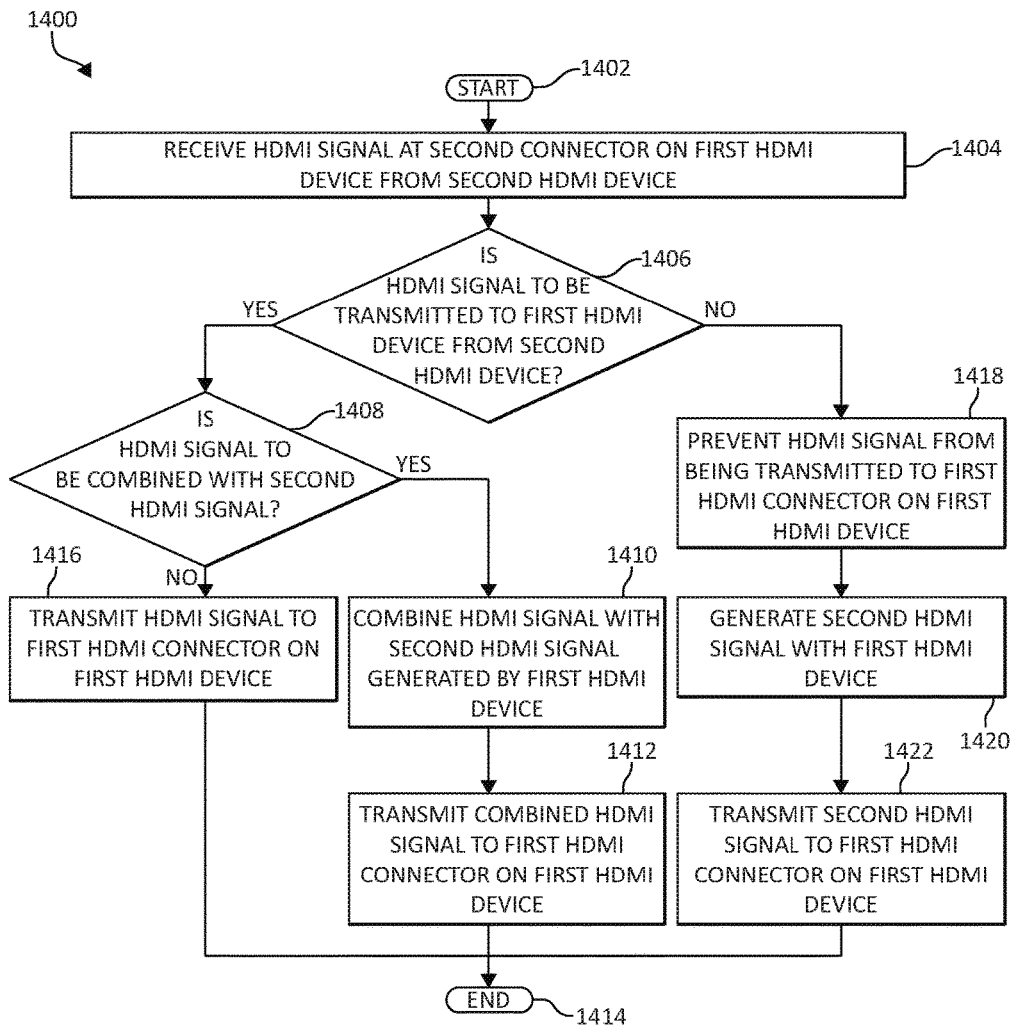
FIG. 14 is a flowchart diagram depicting an exemplary method for managing HDMI data, again in which various aspects of the present invention may be implemented.

Referring now to FIG. 14, a flowchart diagram of an exemplary method 1400 for managing HDMI data (or signals or content), in accordance with various aspects of the present invention, is illustrated. Method 1400 begins (step 1402) with, for example, a first HDMI device (e.g., HDMI device 400 in FIGS. 6-12, having first and second HDMI connectors) being connected to a computing system, such as an LCD TV, and a second HDMI device (e.g., HDMI device 418 in FIGS. 6-12 or a conventional HDMI device) being connected to the first HDMI device. More particularly, in some embodiments, method 1400 begins with an HDMI connector (e.g., a male HDMI connector) of the second HDMI device being inserted into a second (e.g., female) HDMI connector of the first HDMI device, and the first (e.g., male) HDMI connector of the first HDMI device being inserted into an HDMI port (or female connector) of the computing system. It should be understood that in some embodiments, all of the steps described below with respect to method 1400 may be performed by (or implemented within) the first HDMI device (e.g., a single HDMI device), while the second HDMI device may simply provide an HDMI signal to the first HDMI device.

An HDMI signal (or HDMI data) is then received at the second HDMI connector of the first HDMI device (e.g., HDMI device 400) (step 1404). More particularly, in some embodiments, an HDMI signal is sent from the second HDMI device (e.g., HDMI device 418) to the second HDMI connector of the first HDMI device (e.g., HDMI device 400).

It is then determined whether or not the HDMI signal is to be transmitted to the first HDMI connector on the first HDMI device (e.g., HDMI device 400) (step 1406). The determination of whether or not the HDMI signal is to be sent to the first HDMI connector may be based on, for example, a time schedule, priority signals, etc., as described above.

If the HDMI signal is to be transmitted to the first HDMI connector, it is then determined whether or not the HDMI signal is to be combined with a second HDMI signal (or modified using data from a second HDMI signal) (step 1408). If so, the HDMI signal is then combined with a second HDMI signal that is, for example, generated by an electronic assembly within the first HDMI device (e.g., received by the wireless receiver 412 in HDMI device 400) (step 1410), as described above in greater detail. The combined HDMI signal is then transmitted to the first HDMI connector on the first HDMI device (e.g., HDMI device 400) (step 1412). Method 1400 ends (step 1414) with, for example, the HDMI device(s) being disconnected from the computing system.

If the HDMI signal is not to be combined with a second HDMI signal (step 1408), the HDMI signal is then transmitted to the first HDMI connector on the first HDMI device (e.g., HDMI device 400) (step 1416). Method 1400 then ends (step 1414) with, for example, the HDMI device(s) being disconnected from the computing system.

If the HDMI is signal is not to be transmitted to the first HDMI connector on the first HDMI device (step 1406), the HDMI signal is then prevented (or blocked) from being sent to the first HDMI connector (or if the signal is already being transmitted to the first HDMI connector, the transmission is ceased) (step 1418). A second HDMI signal is then generated by (or with) the first HDMI device (e.g., by the computing device 410 within HDMI device 400) (step 1420). The second HDMI signal is then transmitted to the first HDMI connector on the first HDMI device (step 1422). Method 1400 then ends (step 1414) with, for example, the HDMI device(s) being disconnected from the computing system.

It should be understood that method 1400 may be performed by (or implemented within) any of the HDMI devices described above with respect to FIGS. 6-12. That is, although the description of method 1400 references HDMI device 400 (i.e., the most downstream HDMI device) in particular, it should be noted that method 1400 (as well as any other methods described herein) may be performed by (or implemented within) the other HDMI devices (e.g., HDMI devices 418, 426, and/or 428).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A High-Definition Multimedia Interface (HDMI) device, comprising:
a body;
a first HDMI connector coupled to the body;
a second HDMI connector coupled to the body; and
an electronic assembly including a processor coupled to the body and being configured to operate in a first mode and a second mode, wherein:
in the first mode of operation, the electronic assembly causes HDMI data received at the second HDMI connector to be transmitted directly to the first HDMI connector by bypassing the processor, the processor not being connected to either of the first and second HDMI connectors in the first mode of operation; wherein a physical switch disconnects the first and second HDMI connectors from the processor upon performing the bypass, and
in the second mode of operation, the electronic assembly does not cause the HDMI data received at the second HDMI connector to be transmitted to the first HDMI connector.

2. The HDMI device of claim 1, wherein in the second mode of operation, the electronic assembly causes HDMI data that is generated by the HDMI device to be transmitted to the first HDMI connector.

3. The HDMI device of claim 2, wherein the electronic assembly includes a wireless receiver configured to receive the HDMI data that is generated by the HDMI device.

4. The HDMI device of claim 3, wherein the wireless receiver is a wireless local area networks (LAN) receiver, a Long-Term Evolution (LTE) receiver, or LTE Advanced receiver.

5. The HDMI device of claim 2, wherein the electronic assembly includes a memory, wherein the HDMI data that is generated by the HDMI device is stored in the memory.

6. The HDMI device of claim 2, wherein the electronic assembly includes a system on chip (SoC).

7. The HDMI device of claim 1, wherein the electronic assembly is further configured to operate in a third mode, wherein in the third mode of operation, the electronic assembly causes at least some of the HDMI data received at the second HDMI connector and at least some of the HDMI data that is generated by the HDMI device to be transmitted to the first HDMI connector simultaneously.

8. The HDMI device of claim 1, wherein the first HDMI connector is a male HDMI connector, and the second HDMI connector is a female HDMI connector.

9. The HDMI device of claim 8, wherein the first HDMI connector is positioned on a first end of the body, and the second HDMI connector is positioned on a second end of the body, opposite the first end.

10. A High-Definition Multimedia Interface (HDMI) device, comprising:
a body;
a male HDMI connector coupled to the body;
a female HDMI connector coupled to the body; and an electronic assembly including a processor coupled to the body and being configured to operate in a first mode and a second mode, wherein:
- in the first mode of operation, the electronic assembly causes HDMI data received at the female HDMI connector to be transmitted directly to the male HDMI connector by bypassing the processor, the processor not being connected to either of the first and second HDMI connectors in the first mode of operation; wherein a physical switch disconnects the first and second HDMI connectors from the processor upon performing the bypass, and
- in the second mode of operation, the electronic assembly does not cause the HDMI data received at the female HDMI connector to be transmitted to the male HDMI connector and causes HDMI data that is generated by the HDMI device to be transmitted to the male HDMI connector.

11. The HDMI device of claim 10, wherein the electronic assembly includes a wireless receiver configured to receive the HDMI data that is generated by the HDMI device.

12. The HDMI device of claim 10, wherein the electronic assembly includes a memory, wherein the HDMI data that is generated by the HDMI device is stored in the memory.

13. The HDMI device of claim 10, wherein the electronic assembly includes a system on chip (SoC).

14. The HDMI device of claim 10, wherein the male HDMI connector is positioned on a first end of the body, and the female HDMI connector is positioned on a second end of the body, opposite the first end.

15. A High-Definition Multimedia Interface (HDMI) device, comprising:
- a body;
- a processor housed within the body;
- a male HDMI connector coupled to the body;
- a female HDMI connector coupled to the body; and
- at least one switch coupled to the body and configured to operate in a first mode and a second mode, wherein:
  - in the first mode of operation, the at least one switch causes HDMI data received at the female HDMI connector to be transmitted directly to the male HDMI connector by bypassing the processor, the processor not being connected to either of the first and second HDMI connectors in the first mode of operation; wherein a physical switch disconnects the first and second HDMI connectors from the processor upon performing the bypass, and
  - in the second mode of operation, the at least one switch does not cause the HDMI data received at the female HDMI connector to be transmitted to the male HDMI connector.

16. The HDMI device of claim 15, wherein in the second mode of operation, the at least one switch causes HDMI data that is generated by the HDMI device to be transmitted to the male HDMI connector.

17. The HDMI device of claim 16, wherein the at least one switch is further configured to operate in a third mode, wherein in the third mode of operation, the at least one switch causes at least some of the HDMI data received at the female HDMI connector and at least some of the HDMI data that is generated by the HDMI device to be transmitted to the male HDMI connector simultaneously.

18. The HDMI device of claim 16, further comprising a wireless receiver configured to receive the HDMI data that is generated by the HDMI device.

19. The HDMI device of claim 16, further comprising a memory, wherein the HDMI data that is generated by the HDMI device is stored in the memory.

* * * * *